(12) United States Patent
Igarashi

(10) Patent No.: US 12,489,980 B2
(45) Date of Patent: Dec. 2, 2025

(54) IMAGE CAPTURING APPARATUS, INFORMATION PROCESSING APPARATUS, CONTROL METHOD, AND STORAGE MEDIUM

(71) Applicant: CANON KABUSHIKI KAISHA, Tokyo (JP)

(72) Inventor: Kenta Igarashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 18/158,919

(22) Filed: Jan. 24, 2023

(65) Prior Publication Data

US 2023/0247306 A1    Aug. 3, 2023

(30) Foreign Application Priority Data

Jan. 28, 2022 (JP) ................... 2022-012429

(51) Int. Cl.
H04N 23/73 (2023.01)
H04N 23/71 (2023.01)
H04N 23/72 (2023.01)
H04N 25/533 (2023.01)

(52) U.S. Cl.
CPC ............ *H04N 23/73* (2023.01); *H04N 23/71* (2023.01); *H04N 23/72* (2023.01); *H04N 25/533* (2023.01); *G06T 2207/10144* (2013.01)

(58) Field of Classification Search
None
See application file for complete search history.

(56) References Cited

U.S. PATENT DOCUMENTS

| | | | | |
|---|---|---|---|---|
| 2013/0308044 A1* | 11/2013 | Mitsunaga | ........... | H04N 25/531 |
| | | | | 348/362 |
| 2013/0329128 A1* | 12/2013 | Kaizu | ................... | H04N 25/76 |
| | | | | 348/367 |
| 2016/0227104 A1* | 8/2016 | Guan | ..................... | H04N 25/53 |
| 2017/0142313 A1* | 5/2017 | Gren | ...................... | H04N 25/78 |
| 2018/0054559 A1* | 2/2018 | Welker | ................ | H04N 23/661 |
| 2018/0176458 A1* | 6/2018 | Tsuchiya | .............. | H04N 23/631 |
| 2019/0246025 A1* | 8/2019 | Duran | ................... | H04N 23/74 |

(Continued)

FOREIGN PATENT DOCUMENTS

JP    5247397 B2    7/2013

*Primary Examiner* — Twyler L Haskins
*Assistant Examiner* — Wesley J Chiu
(74) *Attorney, Agent, or Firm* — Canon U.S.A., Inc. IP Division

(57) ABSTRACT

An image capturing apparatus includes an image capturing unit including an image sensor having an image capturing surface including a plurality of regions for each of which an exposure-related parameter is settable, a calculation unit configured to calculate the exposure-related parameter for at least one region corresponding to a first region among the plurality of regions based on a luminance of the first region in a first image, a prediction unit configured to predict a second region in a second image to be captured after the first image, the second region being similar to the first region, and a control unit configured to perform control so that the calculated exposure-related parameter for the at least one region is applied to at least one region corresponding to the predicted second region among the plurality of regions and that the image capturing unit captures the second image.

13 Claims, 9 Drawing Sheets

(56) References Cited

U.S. PATENT DOCUMENTS

| | | | |
|---|---|---|---|
| 2020/0092455 A1* | 3/2020 | Zhang | B64U 30/20 |
| 2020/0195857 A1* | 6/2020 | Sekine | H04N 25/583 |
| 2020/0396367 A1* | 12/2020 | Segapelli | H04N 23/61 |

* cited by examiner

IMAGE CAPTURING APPARATUS, INFORMATION PROCESSING APPARATUS, CONTROL METHOD, AND STORAGE MEDIUM

BACKGROUND OF THE DISCLOSURE

Field of the Disclosure

The present disclosure relates to an image capturing apparatus, a control method, and a storage medium.

Description of the Related Art

Japanese Patent No. 5247397 discusses a technique for increasing a dynamic range of an image sensor by setting an exposure condition for each of a plurality of regions of an image capturing surface of the image sensor.

SUMMARY OF THE DISCLOSURE

According to an aspect of the present disclosure, an image capturing apparatus includes an image capturing unit including an image sensor having an image capturing surface including a plurality of regions for each of which an exposure-related parameter is settable, a detection unit configured to detect a first region in a first image captured by the image capturing unit, a calculation unit configured to calculate the exposure-related parameter for at least one region corresponding to the first region among the plurality of regions based on a luminance of the first region in the first image, a prediction unit configured to predict a second region in a second image to be captured after the first image, the second region being similar to the first region, and a control unit configured to perform control so that the calculated exposure-related parameter for the at least one region is applied to at least one region corresponding to the predicted second region among the plurality of regions and that the image capturing unit captures the second image.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the accompanying drawings. The below-described exemplary embodiments are mere examples of how the present disclosure is implemented, and intended to be modified or changed as suitable for a configuration of an apparatus to which the present disclosure is applied or for various conditions, and the present disclosure is not limited to the below-described exemplary embodiments. Part of a below-described exemplary embodiment and part of another below-described exemplary embodiment can be combined as appropriate.

(System Configuration)

Figure 1:
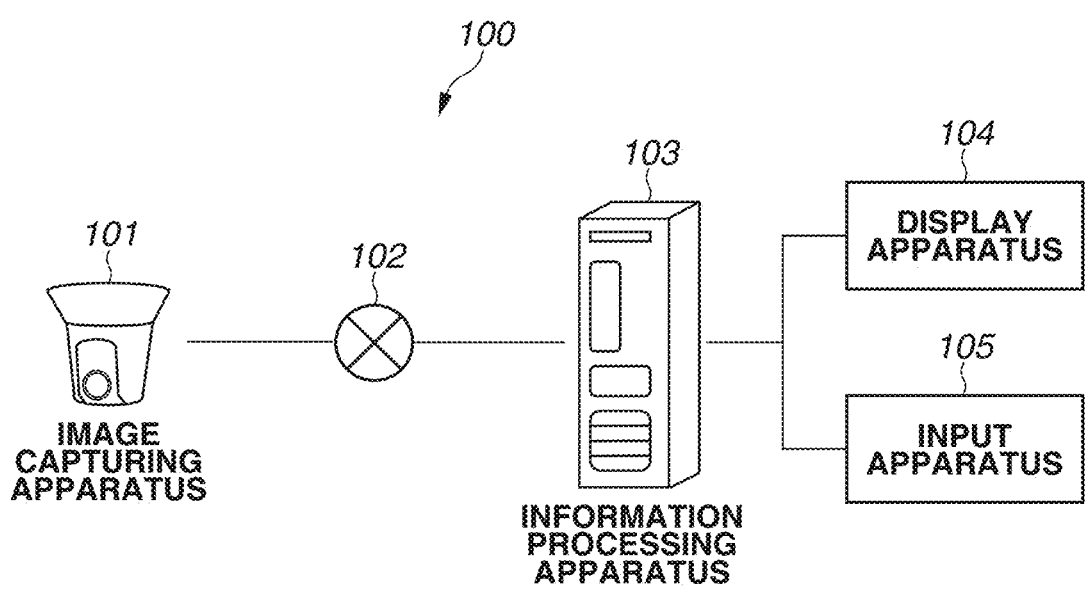
FIG. 1 is a diagram illustrating an example of an image capturing system according to a first exemplary embodiment.

A first exemplary embodiment of the present disclosure will be described below. FIG. 1 is a diagram illustrating an example of a configuration of an image capturing system according to the present exemplary embodiment. An image capturing system 100 includes an image capturing apparatus 101, a network 102, an information processing apparatus 103, a display apparatus 104, and an input apparatus 105.

The image capturing apparatus 101 is capable of communicating with the information processing apparatus 103 via the network 102.

The image capturing apparatus 101 captures a subject image, generates image data, and transmits the image data to the information processing apparatus 103 via the network 102.

The display apparatus 104 and the input apparatus 105 are connected to the information processing apparatus 103. The image data received by the information processing apparatus 103 is output to the display apparatus 104, and the image captured by the image capturing apparatus 101 is displayed on a display unit of the display apparatus 104. The input apparatus 105 is a keyboard, a mouse, and the like and is an interface for inputting operation information about the information processing apparatus 103 and the image capturing apparatus 101. The operation information is, for example, an image capturing condition instruction or a pan-tilt-zoom (PTZ) operation instruction to the image capturing apparatus 101.

While the information processing apparatus 103, the display apparatus 104, and the input apparatus 105 are separate apparatuses according to the present exemplary embodiment, the information processing apparatus 103, the display apparatus 104, and the input apparatus 105 may be integrated together as in a laptop computer. Further, the image capturing apparatus 101 and the information processing apparatus 103 may be connected without going through the network 102 and may be connected directly to each other.

Furthermore, all of the image capturing apparatus 101, the information processing apparatus 103, the display apparatus 104, and the input apparatus 105 may be integrated together as in a consumer camera including a touch panel display.

(Apparatus Configuration)

Figure 2:
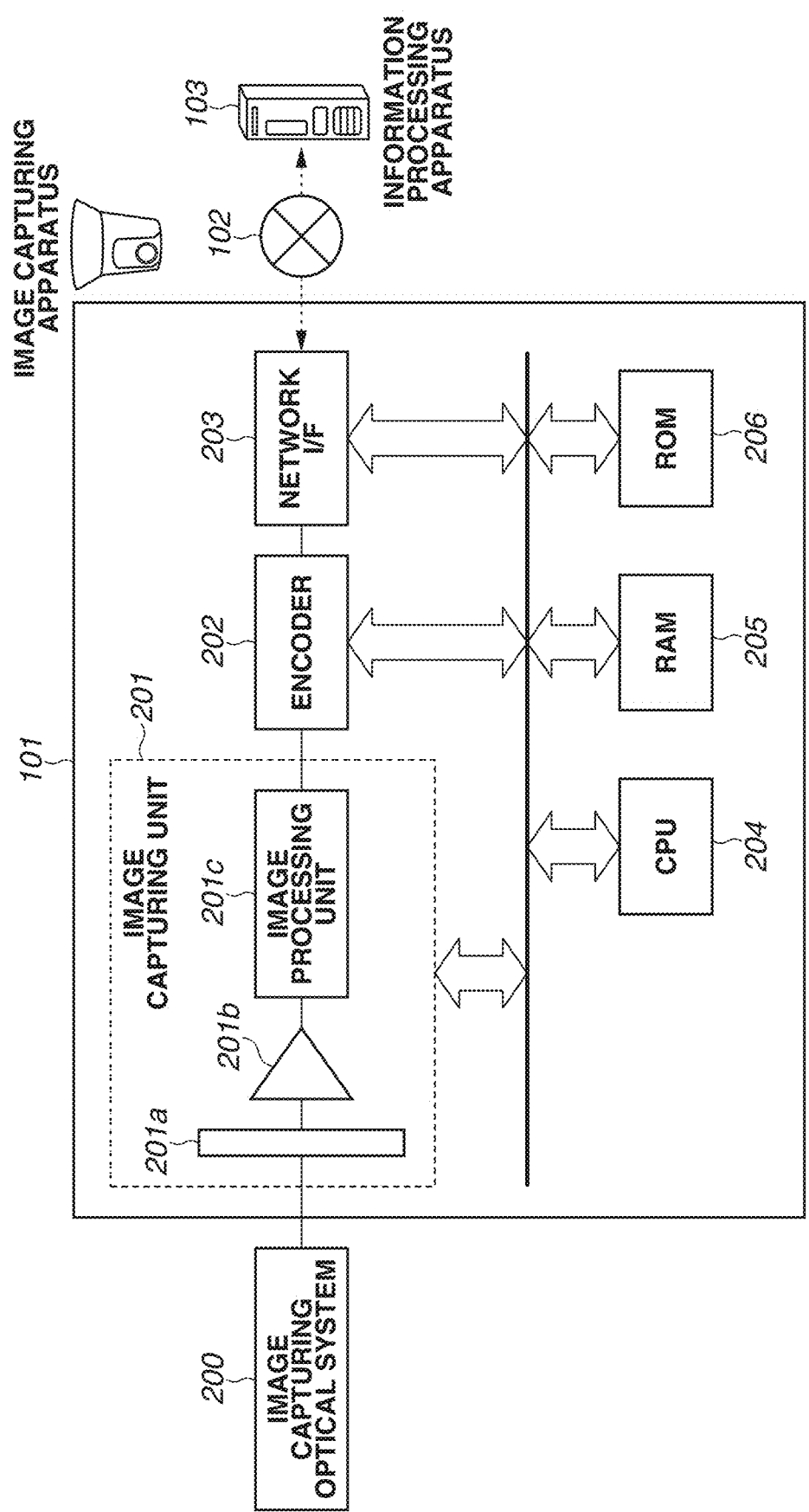
FIG. 2 is a block diagram illustrating an example of an apparatus configuration of an image capturing apparatus according to the first exemplary embodiment.

FIG. 2 is a block diagram illustrating an example of a configuration of the image capturing apparatus 101 according to the present exemplary embodiment. The image capturing apparatus 101 includes an image capturing unit 201, an encoder 202, a network interface (network I/F) 203, a central processing unit (CPU) 204, a random access memory (RAM) 205, and a read-only memory (ROM) 206.

An image capturing optical system 200 are lenses that condenses light from a subject onto an image capturing surface of an image sensor 201a and includes, for example, a zoom lens, a focal lens, and an image stabilizer lens. While the image capturing optical system 200 is separate from the image capturing apparatus 101 and is attached to the image capturing apparatus 101 in an attachable and detachable manner according to the present exemplary embodiment, the image capturing optical system 200 and the image capturing apparatus 101 may be integrated together.

The image capturing unit 201 includes the image sensor 201a, an amplifier 201b, and an image processing unit 201c. The image sensor 201a, the amplifier 201b, and the image processing unit 201c may be separate from each other or may be integrated together. The image sensor 201a is, for example, a charge coupled device (CCD) sensor or a complementary metal oxide semiconductor (CMOS) sensor. Pixels including photoelectric conversion elements are two-dimensionally arranged on the image capturing surface of the image sensor 201a. The pixels convert light from a subject that has been condensed by the image capturing optical system 200 into electric signals and output the electric signals. Exposure-related parameters are settable for each of a plurality of regions including a plurality of pixels (e.g., 128×128 pixels in total). The exposure-related parameters are, for example, an exposure time and gain.

The amplifier 201b amplifies the electric signals output from the image sensor 201a and outputs the amplified electric signals. The amplifier 201b is provided for each pixel, and a signal amplification factor (analog gain) used by the amplifier 201b is included in the exposure-related parameters and is settable for each of a plurality of regions of the image sensor 201a. Each region of the image sensor 201a is referred to as "exposure region" or "divisional region". Specifically, each region representing a pixel group on the image capturing surface of the image sensor 201a for which the exposure-related parameters are independently controlled is an exposure region.

The image processing unit 201c performs analog-to-digital (A/D) conversion to convert the electric signals that are analog signals output from the amplifier 201b into digital signals. The image processing unit 201c further performs image processing including demosaicing processing, white balance processing, and gamma processing on the converted digital data (image data). The image processing unit 201c performs brightness correction on the image data by increasing or decreasing digital values of the image data corresponding to each of the plurality of regions of the image sensor 201a.

A correction value (digital gain) of the brightness correction is also settable for each of the plurality of regions and is included in the exposure-related parameters.

The encoder 202 encodes the image data output from the image capturing unit 201 in a file format, such as Motion Joint Photographic Experts Group (Motion JPEG), H.264, or H.265, and outputs the encoded image data.

The network I/F 203 is an interface that transmits the image data output from the encoder 202 to the information processing apparatus 103 via the network 102. While the encoded image data is transmitted to the information processing apparatus 103 according to the present exemplary embodiment, the encoded image data may be stored in a removable external storage device, such as a Secure Digital card (SD card), or in an internal storage device, such as the ROM 206.

The CPU 204 controls the image capturing apparatus 101.

The RAM 205 provides a work area for the CPU 20 to use in performing processing.

Further, the RAM 205 functions as a frame memory and as a buffer memory.

The ROM 206 stores programs and image data for the CPU 204 to use to control the image capturing apparatus 101.

(Functional Configuration)

Figure 3:
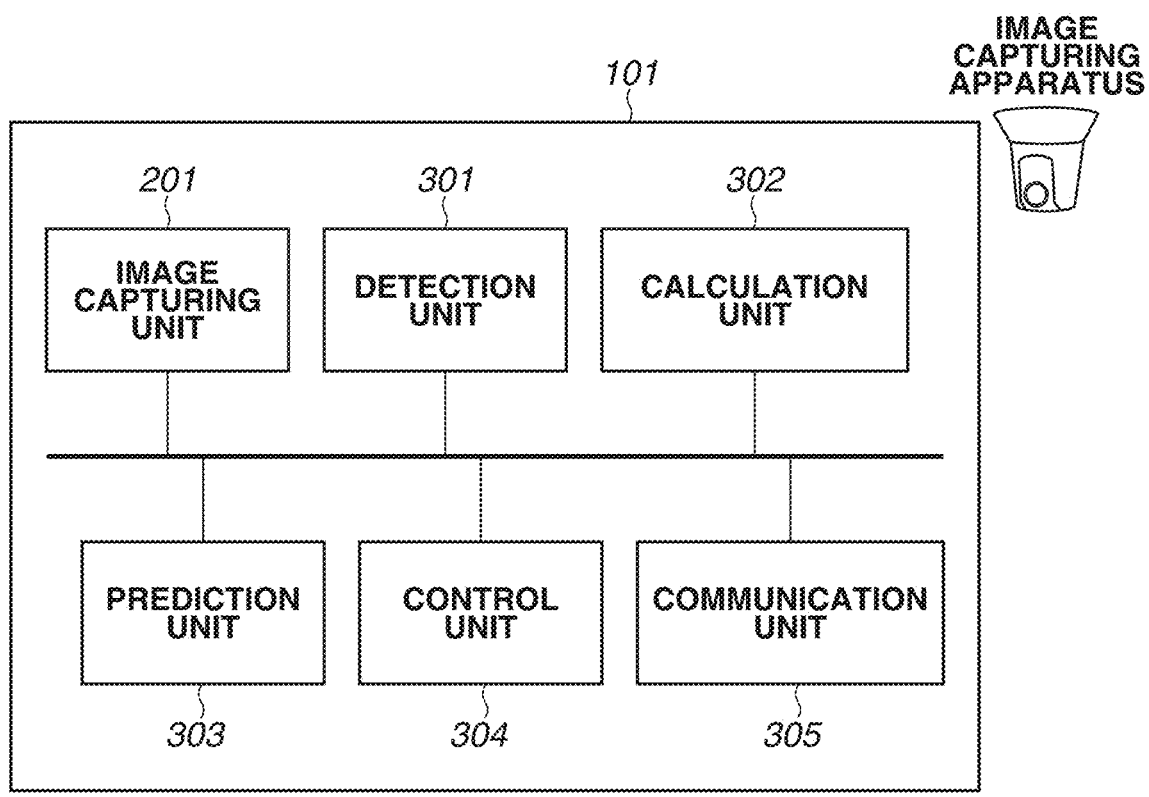
FIG. 3 is a block diagram illustrating an example of a functional configuration of the image capturing apparatus according to the first exemplary embodiment.

FIG. 3 is a block diagram illustrating an example of a functional configuration of the image capturing apparatus 101 according to the present exemplary embodiment. For each function that is to be realized by software among functional blocks illustrated in FIG. 3, a program for providing the function of the functional block is stored in a storage medium, such as the ROM 206. The program is then read to the RAM 205, and the CPU 204 executes the read program, thus realizing the function. For each function that is to be realized by hardware, for example, a dedicated circuit may be automatically generated on a field programmable gate array (FPGA) based on a program for realizing the function of the functional block using a predetermined compiler. Alternatively, a gate array circuit may be formed, as in the FPGA, to realize the function as hardware. An application-specific integrated circuit (ASIC) may be used to realize the function. The functional block configuration in FIG. 3 is a mere example, and a plurality of functional blocks may form a single functional block or any may be divided into blocks that perform a plurality of functions.

The image capturing apparatus 101 includes the image capturing unit 201, a detection unit 301, a calculation unit 302, a prediction unit 303, a control unit 304, and a communication unit 305.

The image capturing unit 201 includes the image sensor 201a having the image capturing surface including the plurality of regions for each of which the exposure-related parameters are settable, as described above. The exposure-related parameters include at least one of an exposure time (shutter speed), an analog gain, a digital gain, and an exposure value and are also referred to as "exposure condition".

The detection unit 301 detects a first region in a first image captured by the image capturing unit 201.

Figure 4:
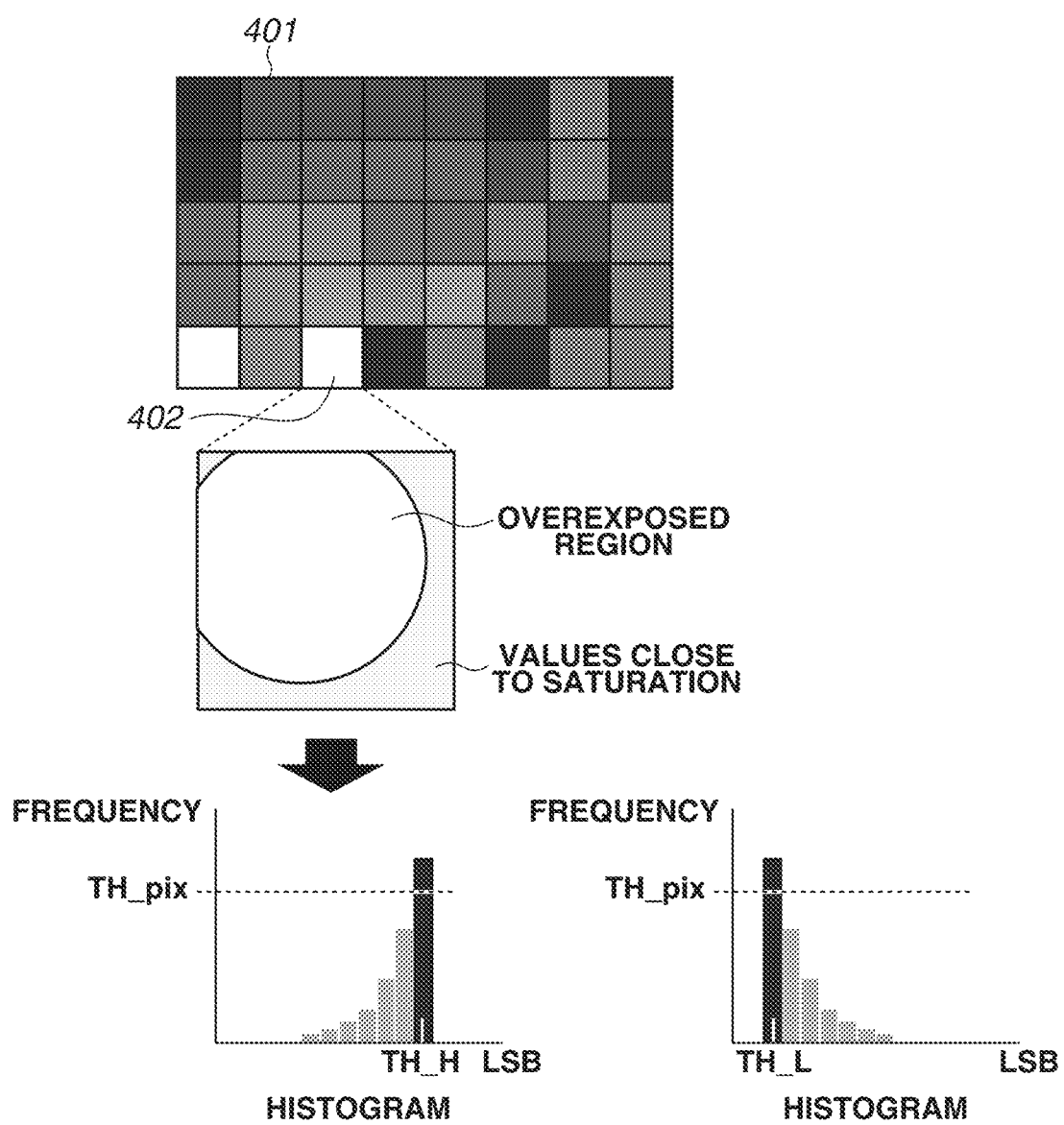
FIG. 4 is a diagram illustrating an example of an image captured by the image capturing apparatus according to the first exemplary embodiment and a histogram for each region.

The first region refers to a subject region or a region that satisfies a predetermined condition. Here, a specific example of the predetermined condition will be described. FIG. 4 is a diagram illustrating an example of a first image captured by the image capturing unit 201 of the image capturing apparatus 101 according to the present exemplary embodiment and a first region in the first image. Grid lines in a first image 401 indicate boundary lines of image regions corresponding to the plurality of regions of the image capturing surface of the image sensor 201a. While a case where a first region 402 corresponds to a single region of the image capturing surface of the image sensor 201a is described as an example according to the present exemplary embodiment, a plurality of regions of the image capturing surface of the image sensor 201a may correspond to a first region. As illustrated in FIG. 4, the first region 402 is an overexposed region in which most part is overexposed, and the remaining part other than the overexposed part is also close to a saturated state. Graphs at a lower portion of FIG. 4 illustrate an example of luminance histograms of the first region 402. The left histogram is a graph corresponding to the first region 402. The right histogram is an example of the other regions. Each horizontal axis of the graphs represents gradations of luminance, and each vertical axis of the graphs represents output frequencies (number of pixels). The histograms are acquired for each exposure region and indicate the number of pixels each of which outputs the respective gradation in the corresponding exposure region. The luminance histogram in the first region 402 indicates that the output frequency of a luminance TH_H of a region in a saturated state is the highest and that other output frequencies are closer to the right in terms of gradations. According to the present exemplary embodiment, the predetermined condition is that the output frequency of TH_H is higher than or equal to a predetermined threshold value Th_pix. With the predetermined condition thus set, a region with a large overexposed region is detected as a first region. The histogram at the lower right of FIG. 4 indicates an example of a case where the predetermined condition is that an output frequency of a luminance TH_L of an underexposed region is higher than or equal to the predetermined threshold value Th_pix. In such a case, a region with a large underexposed region is detected as a first region.

As described above, according to the present exemplary embodiment, a region where the number of pixels having a predetermined luminance (pixel value) is greater than or equal to a predetermined threshold value is detected as a feature region (first region). An exposure region where the number of pixels having a luminance lower than or equal to a first threshold value or the number of pixels having a luminance higher than or equal to a second threshold value is greater than or equal to a third threshold value may be detected as a feature region. In other words, the detection unit 301 detects the exposure region that satisfies the predetermined condition as a feature region.

Methods for detecting a feature region by the detection unit 301 are not limited to the above-described method, and a feature region may be detected by using a known technique, such as subject detection. The feature region that the detection unit 301 detects includes a subject region as described above. More specifically, a moving subject region determined based on an image analysis, such as a change in luminance and a background difference, is also an example of the feature region and may be detected by the detection unit 301. The detection unit 301 performs a function as an extraction unit that extracts a feature amount of a subject in a feature region.

Further, the detection unit 301 detects a region adjacent to a first region as a first region based on a comparison result of comparing the exposure-related parameters of the region adjacent to the feature region (first region) and the exposure-related parameters of the feature region. More specifically, in a case where a difference between the exposure condition of the region adjacent to the feature region and the exposure condition of the feature region falls within a predetermined range, the adjacent region is also detected as a feature region.

The calculation unit 302 calculates the exposure-related parameters for each of the plurality of regions of the image capturing surface of the image sensor 201a based on the luminances of the first image captured by the image capturing unit 201. An example of a specific calculation method will be described below. Initially, the calculation unit 302 obtains a luminance histogram of the first region. Next, a plurality of exposure-related parameters to be applied to the first region is calculated so that a median value of the luminance histogram is gray (the luminance is 128 or close to 128 in a case where the luminance gradations are illustrated by a histogram of 8 bits).

The prediction unit 303 predicts a second region in a second image to be captured after the first image. The second region corresponds to the first region. For example, in a case where the first region detected by the detection unit 301 is a subject region, a subject region in the second image is predicted before the second image is captured by the image capturing unit 201. The prediction unit 303 predicts a position of the second region. The position of the subject region (second region) in the second image that corresponds to the subject region (first region) detected from the first image is predicted. The position of the second region is predicted from, for example, a plurality of images captured at different time points by the image capturing unit 201. In other words, a movement direction and a movement amount of the subject region (first region) are calculated by calculating a movement vector from the plurality of images captured at different time points. Thus, the prediction unit 303 is enabled to predict where the position of the subject region (second region) is likely to be in the second image which is captured by the image capturing unit 201. The plurality of images for calculating the movement vector may include the first image or may exclude the first image. The plurality of images for calculating the movement vector is desirably captured after the first image. In a case where the second image is to be captured after (immediately after) the first image, the movement vector may be calculated from a plurality of images captured before the first image, and the second region may be predicted based on the calculated movement vector. Alternatively, the second region may be predicted using a method other than the movement vector method. For example, a deep learning model may be used to predict the second region from the first image. Yet alternatively, in a case where the first region detected by the detection unit 301 includes a person or a vehicle, the position of the second region (region including the person or the vehicle) in the second image may be predicted by extracting an orientation of the body or face of the person or a moving direction of the vehicle.

The control unit 304 controls the image capturing unit 201 so that the exposure-related parameters that are calculated by the calculation unit 302 and are applied to the first region are applied to the second region predicted by the prediction unit 303 and the second image is captured.

The communication unit 305 comprehensively controls communication between the image capturing apparatus 101 and the information processing apparatus 103 via the network 102. For example, the communication unit 305 controls a timing to transmit an image captured by the image capturing apparatus 101 to the information processing apparatus 103. For another example, the communication unit 305 performs control to receive operation information transmitted from the information processing apparatus 103 to the image capturing apparatus 101 and to transmit the operation information to the components of the image capturing apparatus 101.

(Description of Operations)

Figure 5:
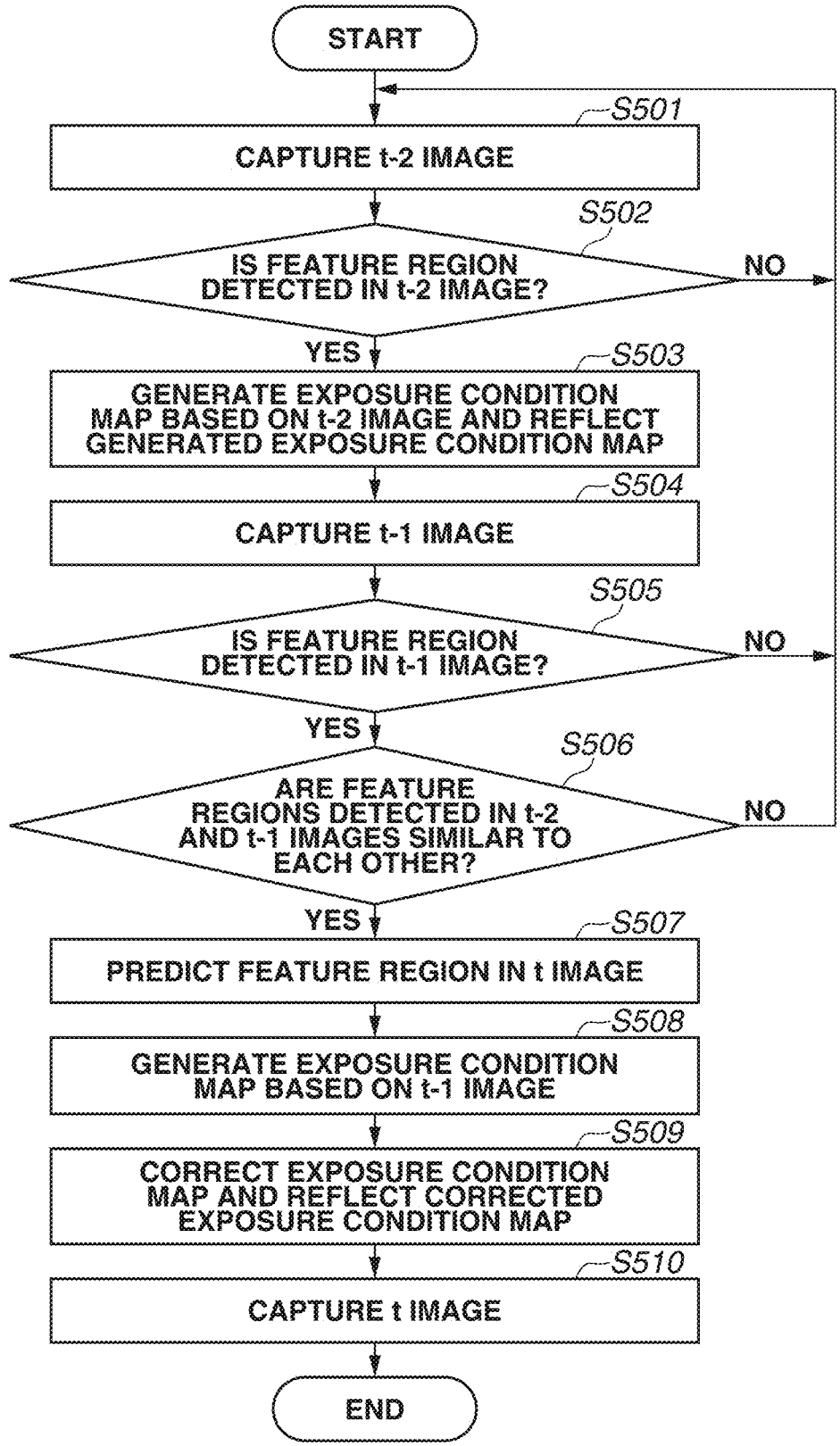
FIG. 5 is a flowchart illustrating an example of operations of the image capturing apparatus according to the first exemplary embodiment.

Operations of the image capturing apparatus 101 according to the present exemplary embodiment will be described below with reference to FIG. 5. FIG. 5 is a flowchart illustrating operations of the image capturing apparatus 101 according to the present exemplary embodiment. The operations illustrated in the flowchart are started in response to a program stored in or outside the image capturing apparatus 101 being loaded into the RAM 205 and the CPU 204 starting execution of the loaded program.

In the present exemplary embodiment, a description will be provided of a case where two images including a first image are captured, a position of a second region in a second image is predicted, and the second image is captured as the third image. The three consecutive frame images that are captured according to the present exemplary embodiment will be referred to as a t−2 image, a t−1 image (first image), and a t image (second image). Furthermore, the t−2 image and the t−1 image are captured at different time points. While the t−2 image, the t−1 image, and the t image are three consecutive frames according to the present exemplary embodiment, the images do not necessarily have to be consecutive.

In step S501, the t−2 image is captured. At this time, the exposure-related parameters to be applied to each of the plurality of regions of the image capturing surface of the image sensor 201a are calculated based on the luminances of the image of the previous frame. The exposure-related parameters to be applied may be calculated for each region individually, or the exposure-related parameters to be applied uniformly to all regions may be calculated.

In step S502, the detection unit 301 performs feature region detection on the t−2 image captured by the image capturing unit 201. The CPU 204 determines whether a feature region is detected in step S502. A feature region to be detected is the region that is detected by a method similar to a method for detecting a first region or a second region. In other words, the first region is a feature region in the first image (t−1 image), and the second region is a feature region in the second image (t image). According to the present exemplary embodiment, the feature region in the t−2 image will be referred to simply as "feature region". If it is determined that a feature region is detected in step S502 (YES in step S502), the processing proceeds to step S503, whereas if no feature regions are detected (NO in step S502), the processing returns to step S502, and the t−2 image is captured again.

In step S503, the calculation unit 302 calculates the exposure-related parameters for each of the plurality of regions of the image capturing surface of the image sensor 201a based on the luminances of the t−2 image. A map indicating the exposure-related parameters to be applied to each of the plurality of regions will be referred to as "exposure condition map". In other words, the exposure condition map is generated in step S503. Furthermore, in step S503, the control unit 304 applies the exposure condition map to the image capturing surface of the image sensor 201a and controls the image capturing by the image capturing unit 201. The control of the image capturing by the control unit 304 includes the control of setting the exposure-related parameters for each of the plurality of regions of the image capturing surface of the image sensor 201a as well as the control of an aperture, an optical zoom, and a focus of the image capturing optical system 200 connected to the image capturing apparatus 101.

In step S504, the image capturing unit 201 controlled by the control unit 304 captures the t−1 image.

In step S505, the detection unit 301 detects a feature region (first region) in the t−1 image (first image). If a feature region is detected (YES in step S505), the processing proceeds to step S506, whereas if no feature regions are detected (NO in step S505), the processing returns to step S501.

In step S506, the CPU 204 determines whether the feature region detected in step S505 is similar to the feature region detected in the t−2 image. In the similarity determination, the luminances of the images in the feature regions or feature amounts of the feature regions obtained based on an image analysis are compared, and in a case where a matching level of the luminances or the feature amounts is greater than or equal to a predetermined value, it is determined that the feature region detected in the t−1 image is similar to the feature region detected in the t−2 image. The similarity may be determined also by comparing the positions or sizes of the feature region in the t−2 image and the feature region in the t−1 image and determining whether the feature regions are at adjacent positions or overlapping positions. If it is determined that the feature region detected in the t−1 image is similar to the feature region detected in the t−2 image (YES in step S506), the processing proceeds to step S507, whereas if it is determined that the feature region detected in the t−1 image is not similar to the feature region detected in the t−2 image (NO in step S505), the processing returns to step S501. Here, the detection unit 301 may detect a region similar to the feature region detected in the t−2 image as the first region of the first image based on the feature amount or luminance of the feature region detected in the t−2 image. Thus, the detection operation and the determination operation may be separate operations or a combined operation. In other words, the operations in steps S505 and S506 may be performed concurrently or separately. While a case where the detection and the determination are separately performed is described as an example according to the present exemplary embodiment, the determination may be performed by the detection unit 301 or by a determination unit (not illustrated).

In step S507, the prediction unit 303 predicts the position of the feature region (second region) in the t image (second image) to be captured after the t−1 image (first image). While this prediction may be performed with various methods as described above, a prediction method based on a movement vector of the feature regions in the t−2 image and the t−1 image will be described below as an example according to the present exemplary embodiment. Various typical methods may be used to calculate the movement vector. For example, in one method, a position of a center of gravity of the feature region in the t−2 image and a position of a center of gravity of the feature region in the t−1 image are calculated, and a vector connecting the positions of the centers of gravity is calculated as a movement vector. A position of a center of gravity of the feature region in the t image is predicted based on an orientation and a size of the movement vector calculated with such methods. A size of the feature region in the t image is predicted based on the size of the feature region in the t−2 image or the t−1 image, the calculated movement vector, and the positions of the feature regions in the images. In the second region prediction to be performed by the prediction unit 303, only the position of the second region may be predicted, or the position and size of the second region may both be predicted.

In step S508, the calculation unit 302 calculates the exposure-related parameters based on the luminances of the t−1 image (first image) and generates the exposure condition map. The exposure-related parameters for the first region are calculated based on, in particular, the luminances of the first region in the first image.

In step S509, the control unit 304 applies the exposure-related parameters calculated based on the luminances of the first region by the calculation unit 302 to the second region predicted by the prediction unit 303. In other words, the exposure condition map generated in step S508 is corrected so that the exposure-related parameters calculated based on the luminances of the first region in the exposure condition map are applied to the second region predicted by the prediction unit 303. The image capturing unit 201 is controlled to capture the second image.

In step S510, the image capturing unit 201 captures the t image (second image) under the control of the control unit 304.

Figure 6:
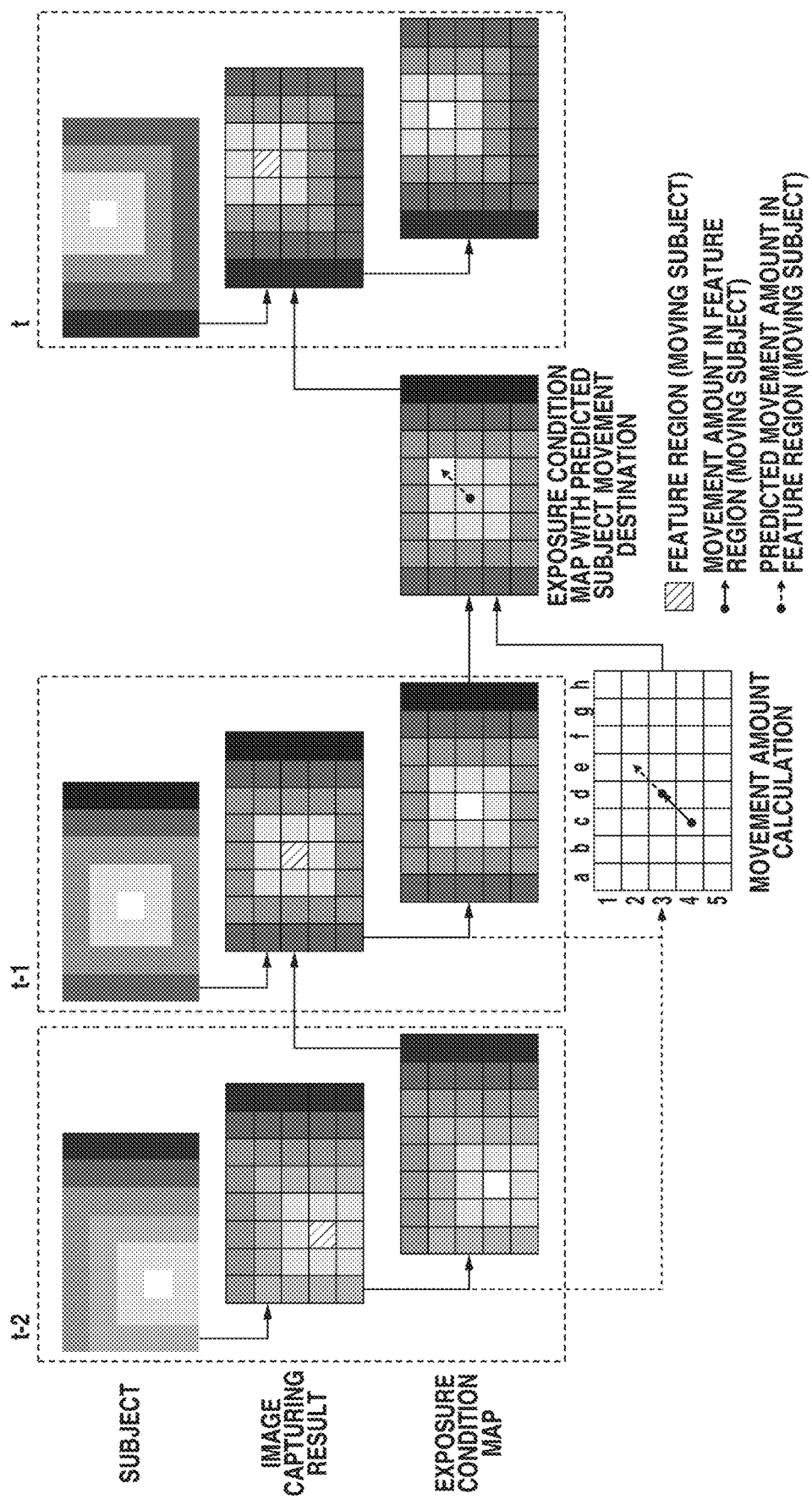
FIG. 6 is a diagram illustrating an example of operations of the image capturing apparatus according to the first exemplary embodiment.

The generating of the exposure condition map for the t image (second image) by the image capturing apparatus 101 according to the present exemplary embodiment will be described below with reference to FIG. 6. The terms "t−2", "t−1", and "t" in FIG. 6 correspond to those in FIG. 5. Gray levels of regions schematically indicate magnitudes of pixel values, and each shaded portion indicates a feature region detected by the detection unit 301 (a shaded portion in the t image indicates a feature region predicted by the prediction unit 303). Further, numbers "1" to "5" and letters "a" to "h" are assigned for convenience to specify the positions of the plurality of regions of the image capturing surface of the image sensor 201a. For example, the detection unit 301 detects the feature region at the position (c, 4) in the t−2 image and the feature region at the position (d, 3) in the t−1 image. In a case where it is determined that the feature region in the t−2 image and the feature region in the t−1 image are similar to each other, the prediction unit 303 predicts the feature region (second region) in the t image. At a lowermost portion in FIG. 6, a movement vector calculated by the prediction unit 303 and a predicted movement vector indicating a predicted movement of the second region are illustrated. In this way, the predicted movement vector is calculated based on the movement vector of the feature regions in the t−2 image and the t−1 image, and the position of the second region (feature region) in the t−2 image is predictable. In this case, the position (e, 2) is predicted as the position of the second region. The control unit 304 generates an exposure condition map based on the predicted position of the feature region, on the basis of the position of the second region that is predicted by the prediction unit 303 and the exposure condition map generated by the calculation unit 302 in step S508. The control unit 304 then applies the generated exposure condition map to the image capturing unit 201 and performs control. The exposure condition map based on the predicted position of the feature region is illustrated in the t image in FIG. 6. As indicated by the exposure condition map in capturing the t image in FIG. 6, the exposure-related parameters calculated based on the luminances of the first region are applied to not the same position as the first region but the predicted position of the second region. For the exposure condition that is originally to be applied to the same position as the first region ((d, 3)), a mean value of the exposure conditions of adjacent neighboring regions excluding the position of the second region is applied. An exposure condition map may be generated in a case where a scale of a movement vector predicted by the prediction unit 303 with respect to the first image or an exposure region satisfies a predetermined condition. For example, in a case where a size of a movement vector is greater than or equal to a predetermined value based on a size of a single exposure region, the exposure condition map is generated, whereas in a case where the size is less than the predetermined value, no exposure condition map is generated. This prevents generation of an exposure condition map in a case where a movement amount in the feature region between the first image and the second image is insignificant enough to be ignored.

The image capturing apparatus 101 according to the present exemplary embodiment enables control of a difference in the exposure conditions of the respective regions that is caused by a movement of an image of a moving object from a frame to another frame in capturing images of the moving object by using the image sensor 201a having the image capturing surface including the plurality of regions for each of which the exposure-related parameters are settable. In other words, the image capturing apparatus 101 according to the present exemplary embodiment enables image capturing with the exposure-related parameters set as suitable for each of the plurality of regions of the image capturing surface even in a case where a luminance distribution changes with time due to movements of a subject or a light source.

The functional blocks other than the image capturing unit 201 according to the present exemplary embodiment may be included in the information processing apparatus 103. In such a case, operations other than the image capturing operation according to the present exemplary embodiment are performed by a CPU (not illustrated), a RAM (not illustrated), and a ROM (not illustrated) in the information processing apparatus 103. At this time, an obtaining unit (not illustrated) of the information processing apparatus 103 obtains the t−2 image and the t−1 image (first image) from the image capturing apparatus 101 via the network 102 and performs respective operations.

First Modified Example

Figure 7:
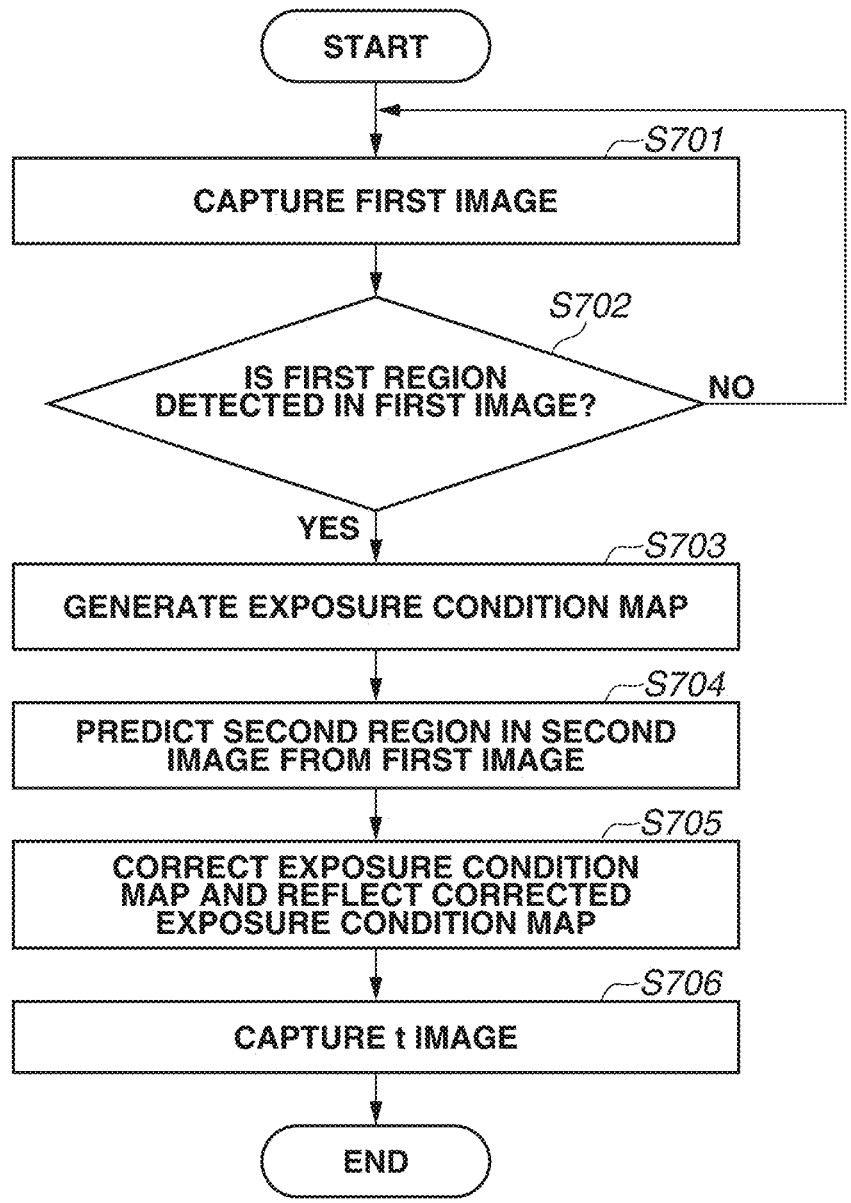
FIG. 7 is a flowchart illustrating an example of operations of an image capturing apparatus according to a modified example of the first exemplary embodiment.

A modified example of the present exemplary embodiment will be described below with reference to FIG. 7. The image capturing apparatus 101 according to the present modified example have a similar apparatus configuration and a similar functional configuration. In the present modified example, a case where two images that are the first image and the second image are captured instead of three images will be described.

(Operations)

Operations of the image capturing apparatus 101 according to the present modified example will be described below. The operations in steps S703, S705, and S706 respectively correspond to the operations in steps S508, S509, and S510 in FIG. 5, so that redundant descriptions thereof are omitted.

In step S701, a first image is captured. At this time, the exposure-related parameters set for each of the plurality of regions of the image sensor 201a may be controlled independently of each other or uniformly.

In step S702, the detection unit 301 detects first region in the first image. If a first region is detected (YES in step S702), the processing proceeds to step S703, whereas if no first region is detected (NO in step S702), the processing returns to step S701.

In step S704, the prediction unit 303 predicts a second region in a second image from the first image. A specific example of a method for predicting a position of the second region is a method for predicting a movement of a subject region (feature region) by using deep learning. It is also possible to predict a movement direction of a subject by detecting an orientation of the subject in a feature region detected by the detection unit 301. A movement distance of, for example, a person may be predicted roughly based on a statistical mean of movement speeds of persons or vehicles, and the position and the size of the second region may be predicted based on the predicted movement direction and the predicted movement distance. Various other methods may also be used to predict the position and the size of the moving object (second region) in the second image.

Figure 8:
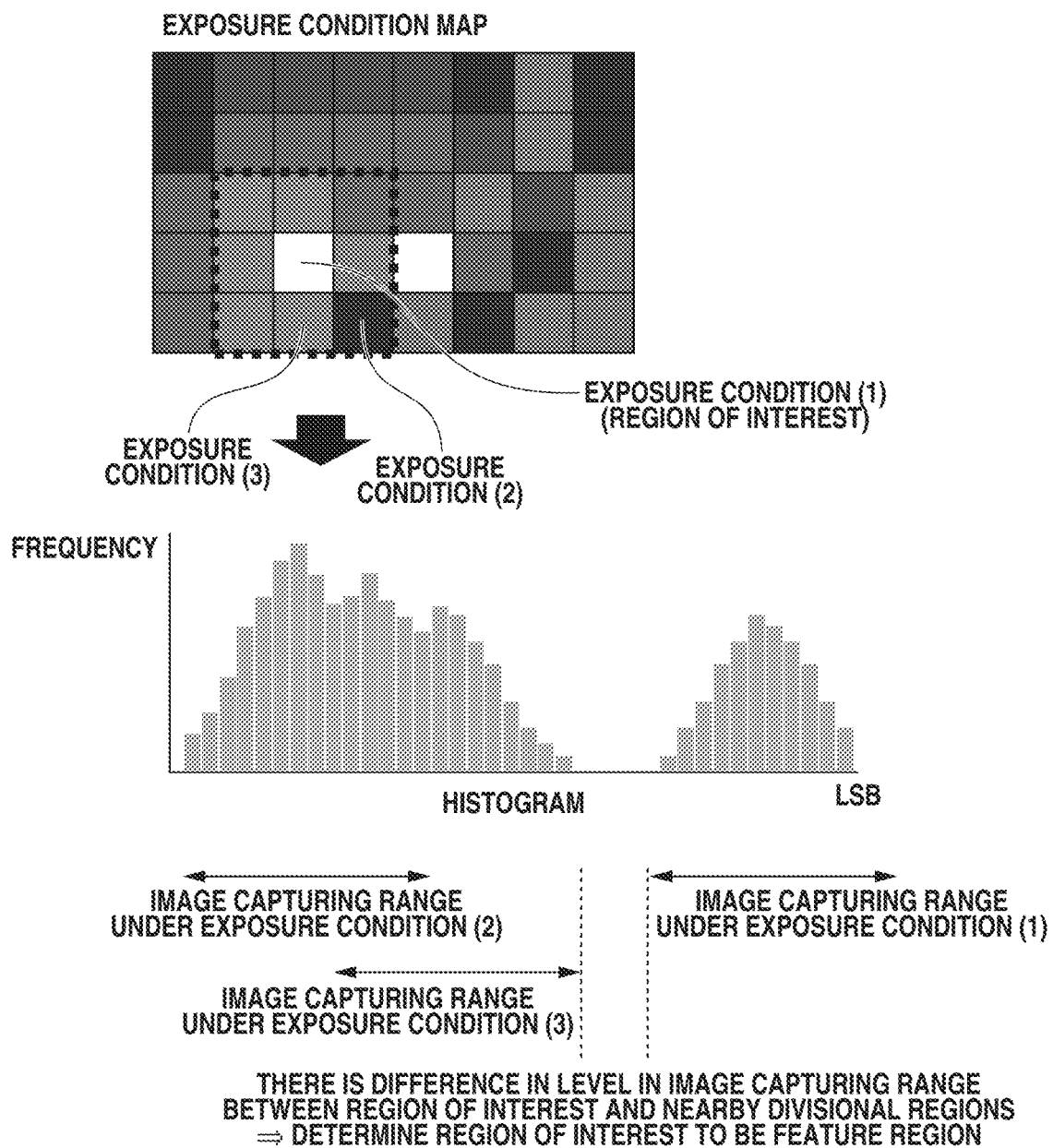
FIG. 8 is a diagram illustrating a method for determining a feature region according to a second exemplary embodiment.

A second exemplary embodiment of the present disclosure will be described below. In the present exemplary embodiment, the feature region determination method is different from the first exemplary embodiment, as described below. FIG. 8 is a diagram illustrating the feature region determination according to the second exemplary embodiment. For example, in a case where an image of a subject emitting light is captured, there arises a difference in the exposure conditions set for the subject region and the regions around the subject region. In particular, in a case where the difference is significant, a subject illumination range in which an image capturing is performable under the exposure condition for the exposure region corresponding to the subject becomes discontinuous to subject illumination ranges in each of which image capturing is performable under the corresponding exposure conditions for the nearby exposure regions adjacent to the subject exposure region. In this case, auto-exposure (AE) processing is to be performed each time the subject crosses a boundary of an exposure region. By determining the region to be a feature region, the length of time needed for a suitable exposure condition to be set is reduced, thus enabling further suitable image capturing. The detection unit 301 recognizes each exposure condition for the corresponding exposure region as a luminance value range in which an image capturing is performable, and determines whether image capturing is performable with a continuous luminance value range under the exposure condition set for a certain exposure region and the exposure conditions set for nearby regions (regions around the certain exposure region). The determination of the continuity is based on whether a difference in level is greater than one level. More specifically, differences in level of exposure conditions of image capturing results are demodulated and corrected, and pixel values of entire images are harmonized. In this state, in a case where one of an upper limit and a lower limit of a pixel value of an adjacent region falls within a range expanded by one from an upper limit or a lower limit of another region, it is determined that the luminance value ranges are continuous.

In a case where the number of regions determined to be discontinuous among eight exposure regions around a region of interest (target exposure region) is greater than or equal to a fourth threshold value, the region of interest is determined to be a feature region.

Figure 9:
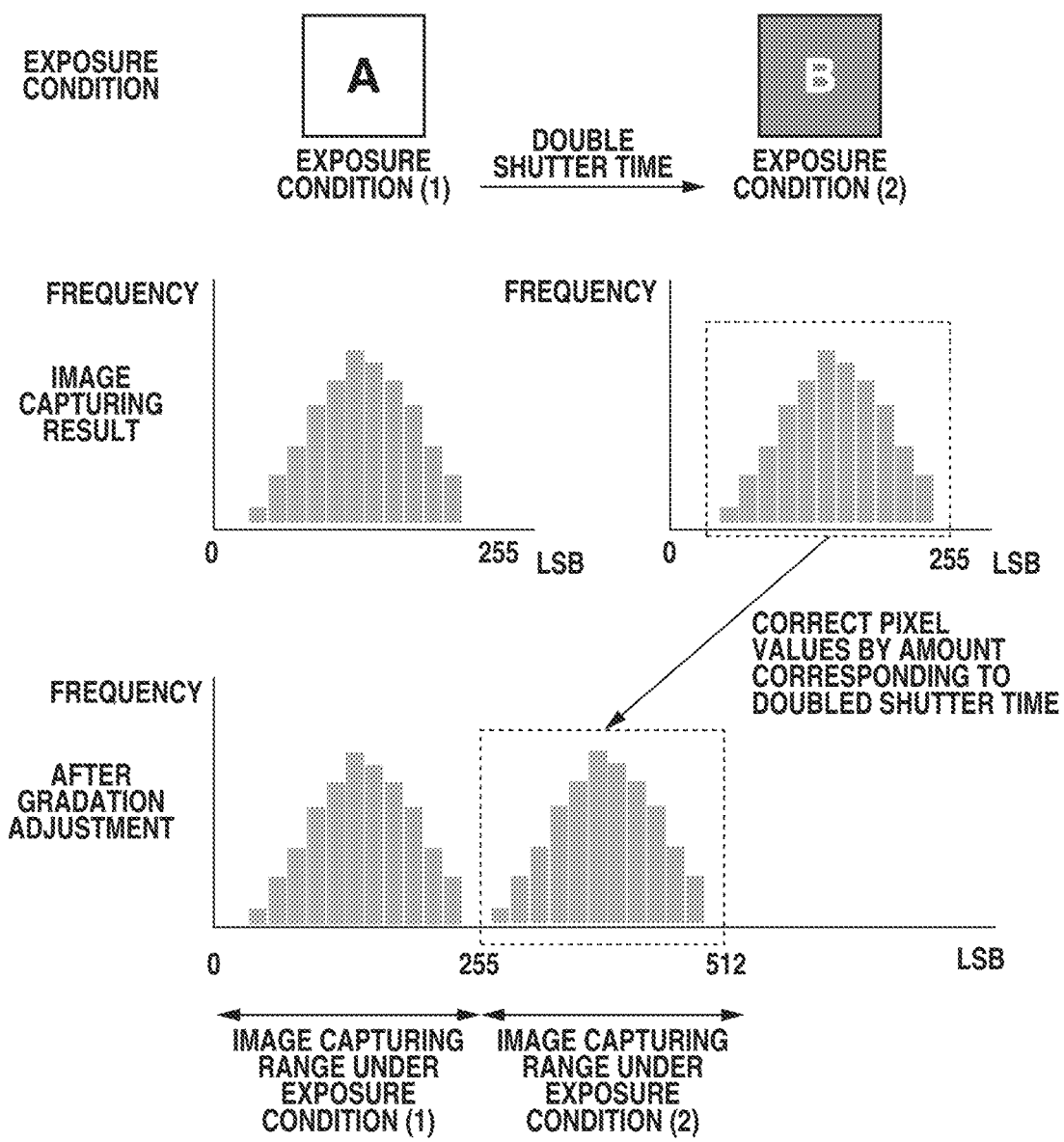
FIG. 9 is a diagram illustrating how to determine whether adjacent exposure regions are continuous according to the second exemplary embodiment.

FIG. 9 illustrates a specific example in which adjacent regions are determined to be continuous. For example, in a case where an 8-bit image may be captured for each region, a minimum shutter time and a minimum gain condition are set for a region A while a shutter time that is twice the minimum shutter time and the minimum gain are set for a region B adjacent to the region A. At this time, in order to achieve conversion into a suitable image without a difference in level between the regions A and B, the pixel values of the region B are corrected to be doubled. In other words, the region A has gradations from 0 to 255 while the region B has gradations from 256 to 511. At this time, since the upper limit value of the region A and the lower limit value of the region B are continuous numbers, the two regions are determined to be continuous. By using the foregoing method, whether the region of interest and the adjacent regions around the region of interest are continuous is determined, and in a case where it is determined that, for example, the region of interest is not continuous with four or more adjacent regions, the region of interest is determined to be a feature region.

According to the present exemplary embodiment, a region corresponding to a moving subject is continuously determined to be a feature region even in a case where the moving subject stops, and the image capturing is suitably performed even after the moving subject starts moving again.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-012429, filed Jan. 28, 2022, which is hereby incorporated by reference herein in its entirety.

What is claimed is:

1. An image capturing apparatus comprising:
an image capturing device including an image sensor having an image capturing surface including a plurality of regions for each of which an exposure parameter is settable individually;
at least one processor; and
a memory in communication with the at least one processor, the memory storing instructions that, when executed by the processor, cause the processor to function as:
a detection unit configured to detect a first region in a first image captured by the image capturing device;
a calculation unit configured to calculate the exposure parameter for at least one region corresponding to the first region among the plurality of regions based on a luminance of the first region in the first image;
a prediction unit configured to predict a second region in a second image to be captured after the first image, the second region being similar to the first region; and
a control unit configured to control the exposure parameter for each of the plurality of regions so that the calculated exposure parameter for the at least one region is applied to at least one region corresponding to the predicted second region among the plurality of regions and that the image capturing device captures the second image, wherein the control unit is configured to control the exposure parameter on a region-by-region basis for the plurality of regions, the exposure parameter for the first region being different than exposure parameters associated with other regions from the plurality of regions, and wherein, based on a comparison result of comparing the exposure parameter for a region adjacent to the first region that has been detected by the detection unit and the exposure parameter for the first region, the detection unit detects, as the first region, the region adjacent to the first region.

2. The image capturing apparatus according to claim 1, wherein the detection unit detects, as the first region, a region that satisfies a predetermined condition in the first image.

3. The image capturing apparatus according to claim 1, wherein the detection unit detects, as the first region, a region where a number of pixels having a luminance value less than or equal to a first threshold value or the number of pixels having a pixel value greater than or equal to a second threshold value is greater than or equal to a third threshold value among the plurality of regions in the first image.

4. The image capturing apparatus according to claim 1, wherein the prediction unit predicts the second region in the second image based on a plurality of images captured at a different time point from each other before the second image.

5. The image capturing apparatus according to claim 1, wherein the prediction unit calculates a movement direction and a movement amount in the first region based on a plurality of images captured at a different time point from each other, and the prediction unit predicts the second region based on the movement direction and the movement amount.

6. The image capturing apparatus according to claim 5, wherein the control unit controls the image capturing device so that the exposure parameter having been applied to the at least one region corresponding to the first region in capturing the first image is applied to a region deviated from the at least one region based on the movement direction and the movement amount among the plurality of regions and that the image capturing device captures the second image.

7. The image capturing apparatus according to claim 1, wherein the prediction unit predicts a position of the second region.

8. The image capturing apparatus according to claim 7, wherein the prediction unit predicts a size of the second region.

9. The image capturing apparatus according to claim 1, further comprising an extraction unit configured to extract a feature amount in the first region, wherein the second region is predicted based on the feature amount.

10. The image capturing apparatus according to claim 1, wherein the exposure parameter includes at least one of an exposure time, an analog gain, and a digital gain.

11. An information processing apparatus configured to communicate with an image capturing apparatus including an image sensor having an image capturing surface including a plurality of regions for each of which an exposure parameter is settable individually, the information processing apparatus comprising:
at least one processor; and
a memory in communication with the at least one processor, the memory storing instructions that, when executed by the processor, cause the processor to function as:
an obtaining unit configured to obtain a first image captured by the image capturing apparatus;
a detection unit configured to detect a first region in the first image;
a calculation unit configured to calculate the exposure parameter for at least one region corresponding to the first region among the plurality of regions based on a luminance of the first region in the first image;
a prediction unit configured to predict a second region in a second image to be captured after the first image, the second region being similar to the first region; and
a control unit configured to control the exposure parameter for each of the plurality of regions so that the calculated exposure parameter for the at least one region is applied to at least one region corresponding to the predicted second region among the plurality of regions and that the image capturing apparatus captures the second image, wherein the control unit is configured to control the exposure parameter on a region-by-region basis for the plurality of regions, the exposure parameter for the first region being different than exposure parameters associated with other regions from the plurality of regions, and wherein, based on a comparison result of comparing the exposure parameter for a region adjacent to the first region that has been detected by the detection unit and the exposure parameter for the first region, the detection unit detects, as the first region, the region adjacent to the first region.

12. A control method for controlling an image capturing apparatus including an image sensor having an image capturing surface including a plurality of regions for each of which an exposure parameter is settable individually, the control method comprising:
detecting a first region in a first image captured by the image capturing apparatus;
calculating the exposure parameter for at least one region corresponding to the first region among the plurality of regions based on a luminance of the first region in the first image;
predicting a second region in a second image to be captured after the first image, the second region being similar to the first region; and
performing control of the exposure parameter for each of the plurality of regions so that the calculated exposure parameter for the at least one region is applied to at least one region corresponding to the predicted second region among the plurality of regions and that the image capturing apparatus captures the second image,
further performing control of the exposure parameter on a region-by-region basis for the plurality of regions, the exposure parameter for the first region being different than exposure parameters associated with other regions from the plurality of regions, wherein, based on a comparison result of comparing the exposure parameter for a region adjacent to the first region that has been detected by the detecting and the exposure parameter for the first region, the detecting detects, as the first region, the region adjacent to the first region.

13. A non-transitory computer-readable storage medium storing a program for causing a computer to perform the control method according to claim 12.

\* \* \* \* \*